United States Patent

Chan et al.

(10) Patent No.: US 6,744,442 B1
(45) Date of Patent: Jun. 1, 2004

(54) TEXTURE MAPPING SYSTEM USED FOR CREATING THREE-DIMENSIONAL URBAN MODELS

(75) Inventors: Ellery Y. Chan, Palm Bay, FL (US); Joseph M. Nemethy, West Melbourne, FL (US); Mark E. Boss, West Melbourne, FL (US); Mark D. Rahmes, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 383 days.

(21) Appl. No.: 09/652,118

(22) Filed: Aug. 29, 2000

(51) Int. Cl.$^7$ .............................................. G06T 11/00
(52) U.S. Cl. ...................... 345/587; 345/582
(58) Field of Search .................. 345/582, 426

(56) References Cited

U.S. PATENT DOCUMENTS

| | | | | |
|---|---|---|---|---|
| 5,760,783 A | * | 6/1998 | Migdal et al. | 345/582 |
| 5,870,097 A | | 2/1999 | Snyder et al. | 345/426 |
| 5,896,139 A | | 4/1999 | Strauss | 345/440 |
| 6,005,580 A | | 12/1999 | Donovan | 345/428 |
| 6,005,583 A | | 12/1999 | Morrison | 345/587 |
| 6,034,691 A | | 3/2000 | Aono et al. | 345/582 |
| 6,046,747 A | | 4/2000 | Saunders et al. | 345/582 |
| 6,456,288 B1 | * | 9/2002 | Brockway et al. | 345/428 |

OTHER PUBLICATIONS

Foley et al., Computer Graphics, Principles and Practice, 1997, Addison–Wesley Publishin Company, 2$^{nd}$ edition, pp. 815–817 827–829, 840–850.*

Oh et al., Image–Based Modeling and Photo Editing, ACM Siggraph, 2001, pp. 433–442.*

Parish et al., Procedural Modeling of Cities, ACM Siggraph, 2001, pp. 301–308.*

LaMar et al., Multiresolution Techniques for Interactive Texture–Based Volume Visulization, IEEE, 1999, pp. 355–362.*

Weinhaus et al., Texture Mapping 3D Models of Real–World Scenes, ACM Computing Surveys, vol. 29, No. 4, 1997, pp. 325–365.*

*IRIS Performer Programmer's Guide*, Chapter 10: Clip Textures, Document Number 007–1680–040, pp. 297–374.

Woo et al., *OpenGL Programming Guide*, Third Edition, The Official Guide to Learning OpenGL, Version 1.2, Chapter 9, Texture Mapping, 1993, pp. 351–427.

* cited by examiner

*Primary Examiner*—Michael Razavi
*Assistant Examiner*—Motilewa Good-Johnson
(74) *Attorney, Agent, or Firm*—Allen, Dyer, Doppelt, Milbrath & Gilchrist, P.A.

(57) ABSTRACT

A method and system are disclosed for creating three-dimensional models in a graphics texture mapping system and are especially useful for creating three-dimensional urban models. A computer includes a graphics application program and an application programming interface. A single rectangular, composite building texture map is formed for each of a plurality of three-dimensional objects corresponding to individual buildings and have a reduced area of pixels within each composite building texture map as caused by rotating individual images. A site model clip map image contains each composite building texture map in a spatially correct position that has been expanded such that no overlap remains.

12 Claims, 8 Drawing Sheets

UNIFIED MEMORY ARCHITECTURE

FIG. 1 *(PRIOR ART)*

TEXTURE CACHE ARCHITECTURE

ORIGINAL IMAGE
CONTRIBUTING TO
COMPOSITE IMAGE

FIG. 5B

ROTATED IMAGE
CONTRIBUTING TO
COMPOSITE IMAGE

FIG. 5C

ROTATED AND
CROPPED IMAGE
CONTRIBUTING TO
COMPOSITE IMAGE

LAYOUT OF INDIVIDUAL IMAGES OF A BUILDING IN THE CBTM

FINAL CLIP MAP IMAGE

FIG. 11 ly, this invention relates to a method and
TEXTURE MAPPING SYSTEM USED FOR CREATING THREE-DIMENSIONAL URBAN MODELS

FIELD OF THE INVENTION

This invention relates to the field of computer graphics, and more particularsystem for texture mapping data in computer graphics applications.

BACKGROUND OF THE INVENTION

Most computer graphic systems use primitive data to present an object or model on a display screen. These primitive data include basic geometric components, such as points, lines, triangles, quadrilaterals, triangle strips and polygons. Primitive data are also used by a computer for defining three-dimensional objects, and can include various x, y, z and w coordinates of the three-dimensional objects. In more advanced graphics application programs, the primitive data includes texture mapping data. Graphics rendering hardware interpolates this type of primitive data and permits objects to be displayed with improved surface detail.

In a texture mapping system used as part of a graphics application package, a source image, i.e., a texture, is mapped onto the surface of a three-dimensional object, such as a building, and then projected into a two-dimensional graphics display screen, such as the normal cathode ray tube of a personal computer or workstation. The point elements (texels) of a texture are applied to the point elements or pixels of the object to be mapped. An application programming interface (API) receives commands from a user through the graphics application program and provides the primitive data to various graphics hardware devices, such as a rasterizer, frame buffer and texture mapping hardware. The rasterizer and texture mapping hardware accept this rendering data and generate final screen coordinates and color data for each pixel in each primitive.

When creating three-dimensional urban models from imagery, such as a geographic location containing many buildings, the models contain polygons that define the three-dimensional shapes of buildings and terrain. In this type of application, associated raster imagery is applied to the polygonal surfaces for added realism and detail. This process is also referred to as "texture mapping." The raster image data is applied to a polygonal model as part of the image generation or rendering process.

Some three-dimensional urban models have many buildings that are much too large to be rendered at interactive frame rates on most computer graphic systems. During the process of texture mapping polygons of a three-dimensional urban model, bottlenecks are usually encountered on the current generation of graphics hardware architectures, which read raster data either from the main system RAM (unified memory architecture) or from a dedicated high-speed texture cache (texture cache architecture). Thus, the overall process is inadequate in some instances. Even if a scene can be loaded, the systems cannot interactively manipulate a fully textured urban model.

SUMMARY OF THE INVENTION

The present invention is advantageous and provides a method for creating three-dimensional models with non-monotonic geometries (true 3D), such as a terrain model with buildings, that can be viewed efficiently in a texture mapping system. The system of the present invention extends the technology used for terrain texturing to building texturing by making a building clip texture that is spatially coherent. It is possible to construct a single image of a building from the many images that are required to paint all the sides. Building images are fit into a composite image of minimum dimension, including rotations and intelligent arrangements. Any associated building vertex texture coordinates can be scaled and translated to match a new composite image. The building images can be arranged in a large "clip map" image, preserving the horizontal relationships of the buildings. If the horizontal relationships cannot be accurately preserved, a "clip grid" middle layer is constructed, which is used by the display software to accurately determine the clip map center.

At the highest level, the system creates a packed rectangle of textures for each of a plurality of three-dimensional objects corresponding to buildings modeled at a geographic site and then spatially arranges the packed rectangle of textures in a correct position within a site model clip map image.

In one aspect of the present invention, the method comprises the step of forming a single rectangular, composite building texture map for each of a plurality of three-dimensional objects corresponding to buildings to be modeled of a geographic site. Individual images are rotated to reduce the area of pixels included within the composite building texture map. Image sizes are processed by area and image length and sorted by area and image length before being packed into a composite building texture map. Each composite building texture map is placed in a spatially corrected position within a site model clip map image. That image is expanded until no overlap remains. The expansion can occur from top right to bottom left or other similar means as selected by those skilled in the art. A location of a clip center can be determined with respect to a particular x,y location for the site model clip map image by looking up values within a clip map clip grid look-up table. This table can be built by interrogating the vertices of all building polygon faces for corresponding texture coordinates and inserting each texture coordinate into the look-up table based on the corresponding polygon face vertex coordinates.

The method further comprises collecting images of each of the plurality of three-dimensional objects from different viewpoints and packing the images into a single rectangle, forming a composite building texture map for an object.

A system for creating three-dimensional models in a texture mapping system is applicable for creating three-dimensional urban models and includes a computer having a graphics application program and an application programming interface. A single rectangular, composite building texture map has each of a plurality of three-dimensional objects corresponding to individual buildings and has a reduced area of pixels within each composite building texture map as caused by rotating the individual images. A site model clip map image contains each composite building texture map in a spatially correct position, which has been expanded such that no overlap remains. Additionally, a clip map clip grid look-up table can be used for determining a location of a clip center with respect to a particular x,y location for the site model clip map image.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention is advantageous and provides a method and system for creating three-dimensional models in texture mapping systems. The system of the present invention extends the technology used for terrain texturing to building texturing by applying clip mapping technology to urban scenes. It is possible to construct a single image of a building from the many images that are required to paint all the sides. Building side images are fit into a composite image of minimum dimension, including rotations and intelligent arrangements. Any associated building vertex texture coordinates can be scaled and translated to match the new composite image. The building images can be arranged in a large "clip map" image, preserving the horizontal relationships of the buildings. If the horizontal relationships cannot be accurately preserved, a "clip grid" middle layer is constructed, which is used by the display software to accurately determine the clip map center.

At its highest level, the system creates a packed rectangle of textures for each of a plurality of three-dimensional objects corresponding to buildings to be modeled for a geographic site. The system then spatially arranges the packed rectangle of textures in a correct position within a site model clip map image. The texture mapping system can be used with a computer graphics-program run on a host or client computer having an OpenGL application programming interface in one preferred aspect of the present invention. The location of a clip center with respect to a particular x,y location for the site model clip map image can be determined by looking up values within a clip map clip grid look-up table, which can be built by interrogating the vertices of all building polygon faces for corresponding texture coordinates. Each texture coordinate can be inserted into the look-up table based on the corresponding polygon face vertex coordinate.

The present invention is advantageous over conventional rendering processes where the models can be too large to be rendered at interactive frame rates on many computer graphic systems. Texture mapping various polygons of a scene is a bottle neck usually encountered on many current generation of graphics hardware architectures, which read raster data either from the main system RAM (unified memory architecture) or from a dedicated high-speed texture cache (texture cache architecture).

Figure 1:
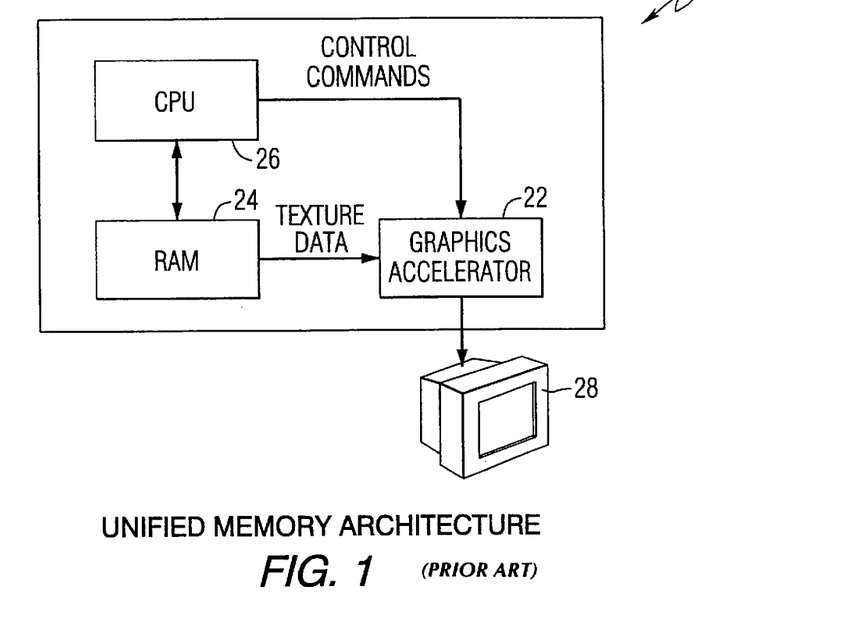
FIG. 1 is a block diagram showing a unified memory architecture used in a texture graphics application.

As shown in FIG. 1, a host computer system is shown at 20 and uses a unified memory architecture. The graphics accelerator 22 accesses texture map data from the system Random Access Memory (RAM) 24. In this process, there may be contention with the central processing unit (CPU) 26 for RAM bandwidth, which lowers the achievable pixel fill rate. Texture data and control commands are input to the graphics accelerator 22 and two-dimensional images are displayed on the monitor 28. The frame drawing time increases gradually with increasing scene complexity as long as there is RAM 24 available. The drawing time will increase drastically when available RAM 24 is exceeded and data must be paged in from slower secondary storage. RAM sizes typically range from 645 MB to 1 GB on the current generation of unified memory architecture systems.

Figure 2:
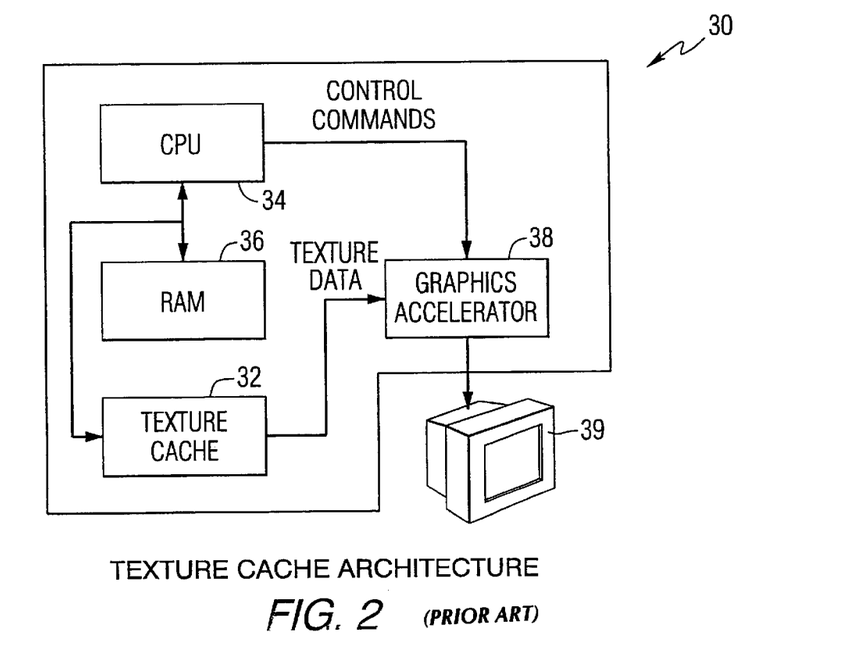
FIG. 2 is a block diagram showing a texture cache architecture used in a texture graphics application.

A host computer system 30 is illustrated at FIG. 2 and uses a texture cache architecture. There is a smaller, high-speed texture cache 32 dedicated to texture data. The system 30 also uses a CPU 34, RAM 36, graphics accelerator 38 and monitor 39, as in the unified memory architecture of FIG. 1. The fill rate is significantly higher from this texture cache 32 than from the main memory of a unified memory system. However, the rate at which data can be loaded into the texture cache from main memory is lower, so when the amount of texture to be rendered exceeds the texture cache size, there is a significant increase in frame drawing time. Typical texture cache sizes range from 1 MB to 64 MB.

In these types of systems, the graphics hardware architecture is hidden by a software layer called the graphics API (application programming interface). Although different programming interfaces could be used, a preferred application programming interface is an industry standard API called OpenGL, which provides a common interface to graphics functionality on a variety of hardware platforms. It also provides a uniform interface to the texture mapping capability supported by the system architecture.

Figure 3:
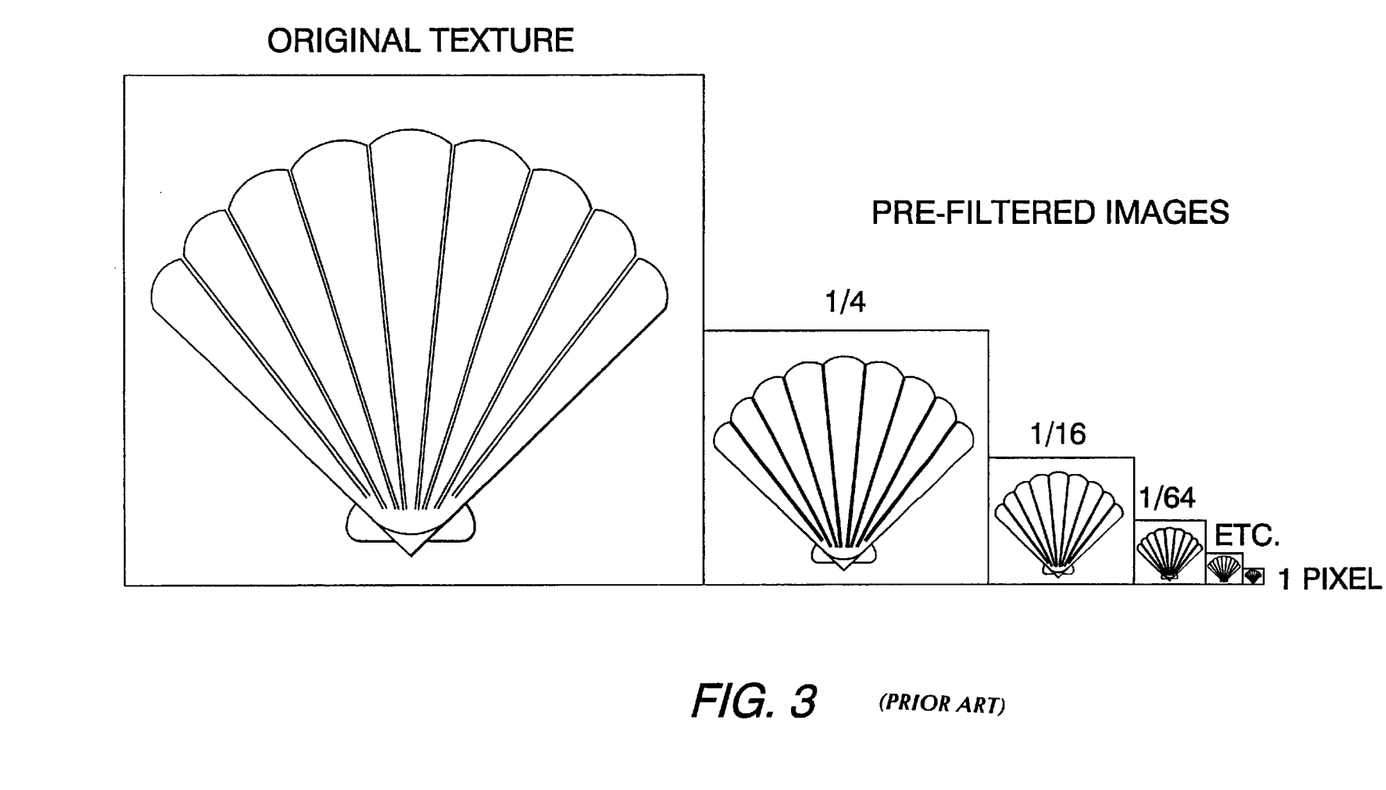
FIG. 3 shows a texture map image with an original texture and pre-filtered images.

As shown with the example in FIG. 3, OpenGL allows a texture map to be represented as a rectangular pixel array with power-of-two dimensions, i.e., $2^m \times 2^n$. To increase rendering speed, some graphics accelerators use pre-computed reduced resolution versions of the texture map to speed up the interpolation between sampled pixels. The reduced resolution image pyramid layers are referred to as MIPmaps by those skilled in the art. MIPmaps increase the amount of storage each texture occupies by 33%.

OpenGL can automatically compute the MIPmaps for a texture, or they can be supplied by the application. When a textured polygon is rendered, OpenGL loads the texture and its MIPmap pyramid into the texture cache. This can be very inefficient if the polygon has a large texture, but happens to be far away in the current view such that it only occupies a few pixels on the screen. This is especially applicable when there are many such polygons.

As known to those skilled in the art, geometric primitives are drawn as either a solid color or smoothly shaded between the colors at the vertices, i.e., drawn without texture mapping. Thus, if a large, ornamentally designed wall is drawn without texture mapping, each design is drawn as a separate polygon. This is an inefficient process and overcome by general texture mapping techniques, where an image of the design, such as a brick wall design, is applied by software rendering techniques to a polygon. Many examples of this process exist, and various images can be depicted on large polygons and other one-, two-, or three-dimensional objects.

Textures are rectangular arrays of data. The individual values in a texture array are called texels. It is possible to specify one-, two-, or three-dimensional textures. As an example, the OpenGL texture mapping standards allow a user to use texture borders and supply a series of related textures of different sizes. Textures can be magnified or minified as they are applied to the pixels. Texture images for multiple polygons may be combined into a single texture image. It is possible to compute and assign appropriate texture coordinates to the vertices of an object and control the behavior of coordinates that lie outside the default range, and repeat textures across a surface. It is also possible to generate texture coordinates to achieve such effects as contour and environment appearances. The texture matrix stack can be manipulated and a queue texture coordinate used. These tools and their uses are known to those skilled in the art with texture mapping techniques. Further details of OpenGL programming are found in Neider, Davis and Woo, *OpenGL Programming Guide*, Addison-Wesley, Reading, Massachusetts, 1993, Chapter 9, the Guide disclosure which is hereby incorporated by reference in its entirety.

Even with the standard features for computing MIPmaps for texture, the loading of the texture and its MIPmap pyramid into any texture cache can be inefficient if the polygon has a large texture, and happens to be far away in a current view, so that it only occupies a few pixels on the screen. This difficulty is even more apparent when there are many such polygons.

This particular inefficiency often impacts the display of three-dimensional models in an urban environment. An urban scene is represented by hundreds or thousands of buildings. Each building wall may be textured with a potentially large number of pixels. A typical perspective view of an urban scene has a few foreground buildings and many buildings off in the distance. The default OpenGL texture mapping behavior causes tens or hundreds of megabytes of texture data to be loaded into the texture cache to render a single frame.

Figure 4:
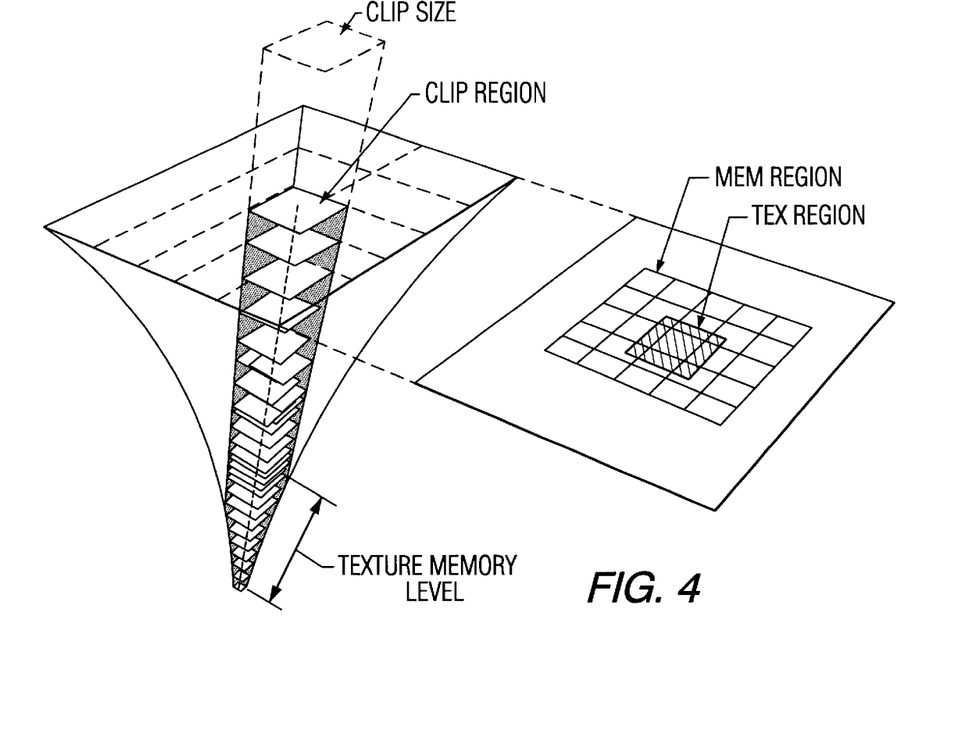
FIG. 4 shows a schematic diagram of a clip region and other image cache components.

As shown in FIG. 4, clip texturing improves rendering performance by reducing the demands on any limited texture cache. Clip texturing can avoid the size limitations that limit normal MIPmaps by clipping the size of each level of a MIPmap texture to a fixed area clip region. When an entire clip map level is smaller than a certain size, the entire level is kept in a texture memory and any larger levels are clipped to a clip region size. A text region as shown in FIG. 4 corresponds to a rectangle of texture memory of each clip level. The clip center is updated as a viewer moves relative to the clip texture geometry. When the clip center is moved, the contents of the texture cache may be updated. A contiguous set of rectangular areas are known as tiles and used to load only portions of the texture at a time and can be loaded individually from a disk into texture memory. This memory is loaded from system memory and the region in that memory is made larger than a destination texture memory and organized into a memory region that acts as a look ahead cache.

The optimization of clip texturing is based on the following assumptions and observations:

1) Assumption: No teleportation. The viewpoint will move gradually as the user navigates through a particular geographic scene, not instantaneously jumping to a drastically different view.

2) Observation: A constant rendered image size. The display pixel dimensions remain constant and finite. Thus, only a finite number of pixels are ever needed to produce an image. For example, if the camera or viewpoint is such that it is positioned to look down at the ground from 10 meters, several square meters of the ground would fill a 1K × 1K screen. If the camera is moved to a height of one kilometer, the screen image would encompass several square kilometers, but more area is seen. It will still take a million pixels to fill the screen, but a lower resolution MIPmap is used.

3) Observation: Locality is preserved. Objects that are located near one another in the scene are near one another in the texture map. This promotes coherent caching behavior for texture files. With clip textures, one major goal is to size the clip region and place the clip center so any nearby visible geometry will fall within the clip region at a sufficiently high level of the clip region texture stack.

Further details for programming and using clip texturing can be found in Silicon Graphics, IRIS Performer Programmer's Guide, Silicon Graphics, Chapter 10: Clip Textures, the Programmer's Guide, which is hereby incorporated by reference in its entirety.

IRIS Performer is a three-dimensional graphics and visual simulation application programming interface that lies on top of OpenGL. It provides support for clip texturing that explicitly manipulates the underlying OpenGL texture mapping mechanism to achieve optimization. It also takes advantage of special hardware extensions on some platforms. Typically, the extensions are accessible through OpenGL as platform specific (non-portable) features.

In particular, IRIS Performer allows an application to specify the size of the clip region, and move the clip region center. IRIS Performer also efficiently manages any multi-level paging of texture data from slower secondary storage to system RAM to the texture cache as the application adjusts the clip center.

Preparing a clip texture for a terrain surface (DEM) and applying it can be a straightforward software routine in texture mapping applications as known to those skilled in the art. An image or an image mosaic is orthorectified and projected onto the terrain elevation surface. This single, potentially very large, texture is contiguous and maps monotonically onto the elevation surface with a simple vertical projection.

Clip texturing an urban model, however, is less straightforward of a software application. Orthorectified imagery does not always map onto vertical building faces properly. There is no projection direction that will map all the building faces. The building textures comprise a set of non-contiguous images that cannot easily be combined into a monotonic contiguous mosaic. This problem is especially apparent in an urban model having a number of three-dimensional objects, typically representing buildings and similar vertical structures. It has been found that it is not necessary to combine contiguous images into a monotonic contiguous mosaic. It has been found that sufficient results are achieved by arranging the individual face textures so that spatial locality is maintained.

Figure 9:
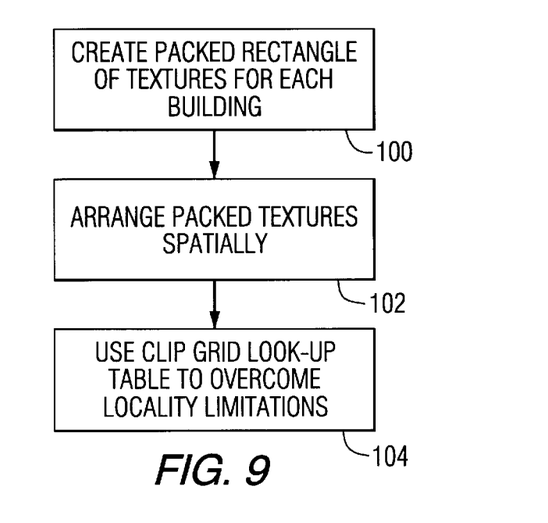
FIGS. 9–11 are flow charts illustrating the basic method for use with the system of the present invention.

FIG. 9 illustrates a high level flow chart illustrating the general overall features of the present invention. For purposes of description, the block elements of the flow charts to be described are explained with reference numerals starting in the 100 series.

The system creates a packed rectangle of textures for each building (block 100). The program assumes that the locality is high enough in this region that the actual arrangement does not matter. The packed textures are arranged spatially (block 102). The spatial arrangement matters at this point, and there are some trade-offs between rearranging things and the clip region size. A clip grid look-up table, however, is used to overcome some of the locality limitations (block 104), as explained in detail below.

Figure 5A:
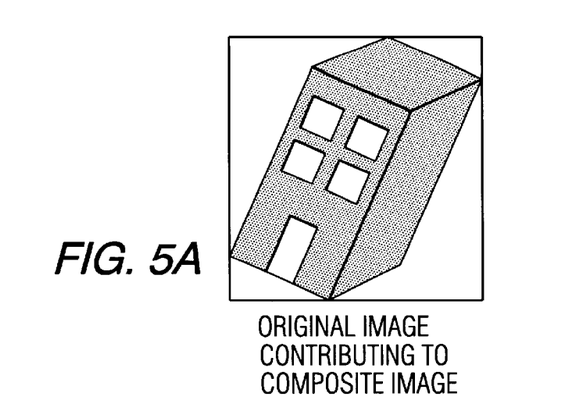
FIGS. 5A–5C show images that contribute to a composite image as it is rotated (FIG. 5B), and then rotated and cropped (FIG. 5C).
Figure 5B:
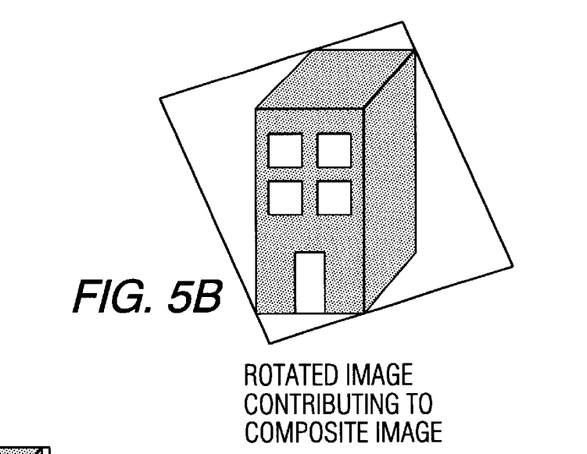
Figure 5C:
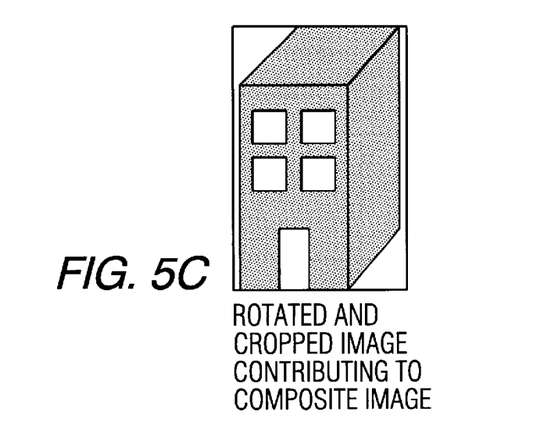
Figure 10:
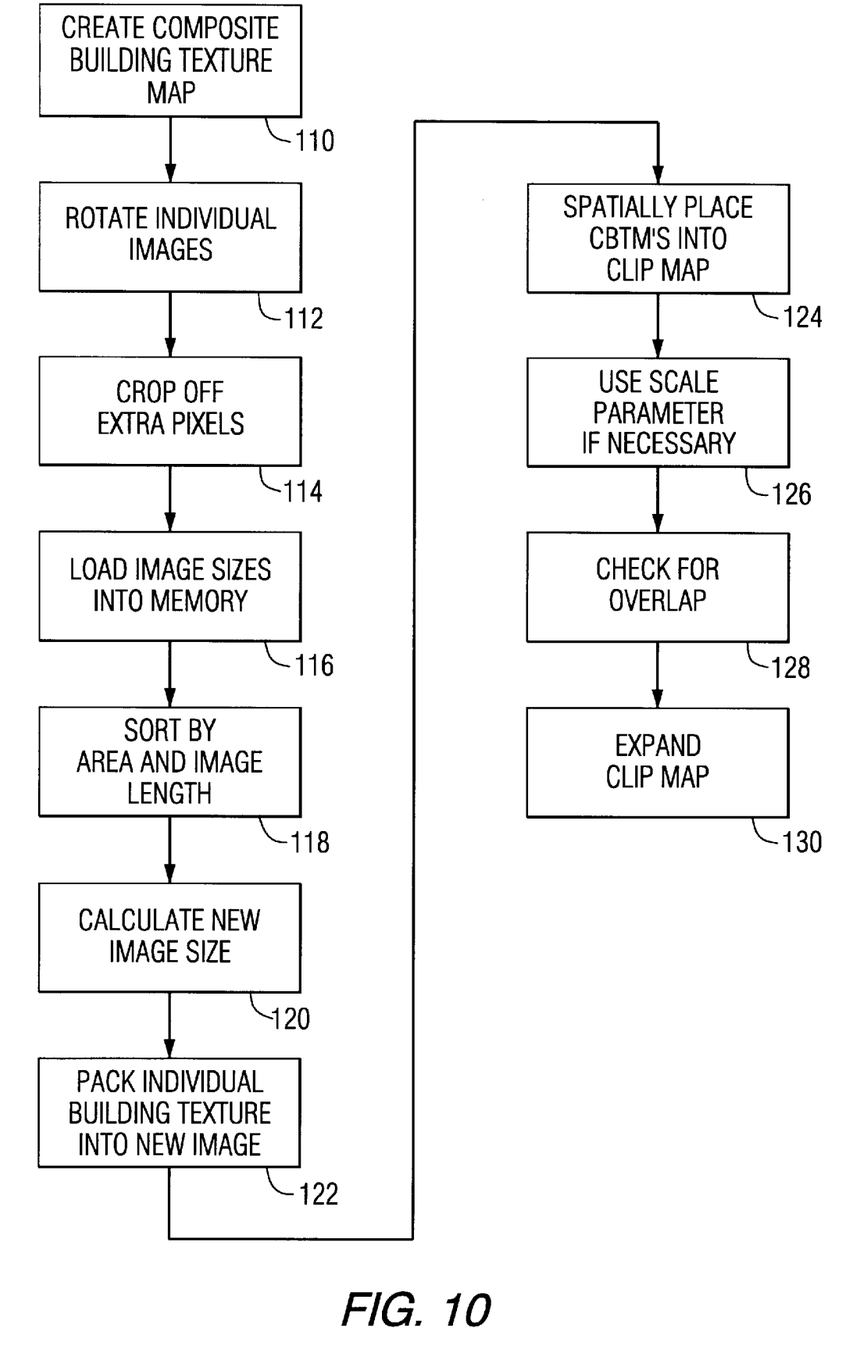

Referring now to FIG. 10, a more detailed flow chart sets forth the sequence of steps used in the method and system of the present invention. A composite building texture map (CBTM) is created (block 110). Because of tiling strategies used later in a site model clip mapping process, all images that are used to texture one building are collected from different viewpoints and are packed into a single rectangular composite building texture map. To help reduce the area of pixels included in the CBTM, individual images (and texture map coordinates) are rotated as shown in the example of FIGS. 5A–5C (block 112) to minimize the rectangular area inside the texture map actually supporting textured polygons. After rotation, extra pixels outside the rectangular footprint are cropped off (block 114).

Figure 6:
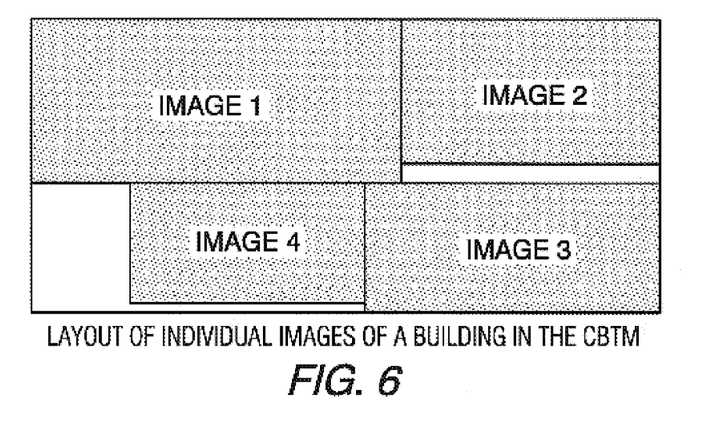
FIG. 6 shows an example of the layout of individual images of a building in a composite building texture map.
Figure 7:
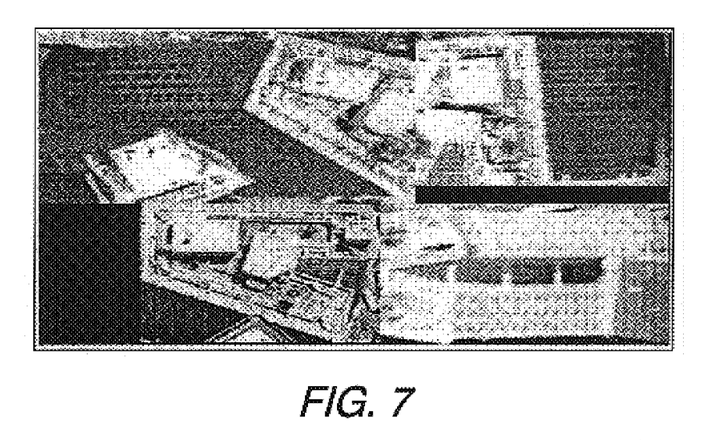
FIG. 7 shows an actual example of a composite building texture map image.

Once the individual images are pre-processed, image sizes for each contributing image are loaded into memory (block 116). These dimensions are sorted by area and image length (block 118). A new image size having the smallest area, with the smallest perimeter, is calculated, which will contain all the building's individual textures (block 120). The individual building textures are efficiently packed into the new image by tiling them alternately from left to right and vice versa, such that the unused space in the square is minimized (block 122). FIG. 6 illustrates an example of a layout showing individual images of a building in the composite building texture map. This is accomplished by an exhaustive search as described to calculate the smallest image dimensions describing each building. FIG. 7 illustrates an actual composite building texture map image.

A site model clip map image is next created. Because each composite building texture map (CBTM) is as small as possible, placing each one spatially correct in a large clip map is realizable. Initially, each composite building texture map is placed in its correct spatial position in a large site model clip map (block 124). A scale parameter is used to initially space buildings at further distances from each other while maintaining relative spatial relations (block 126). Then each composite building texture map is checked for overlap against the other composite building texture maps in the site model clip map (block 128). The site model clip map is expanded from top right to bottom left until no overlap remains (block 130). For models with tall buildings, a larger positive scale parameter may be used to allow for the increased likelihood of overlap. All texture map coordinates are scaled and translated to their new positions in the site model clip map image.

Figure 11:
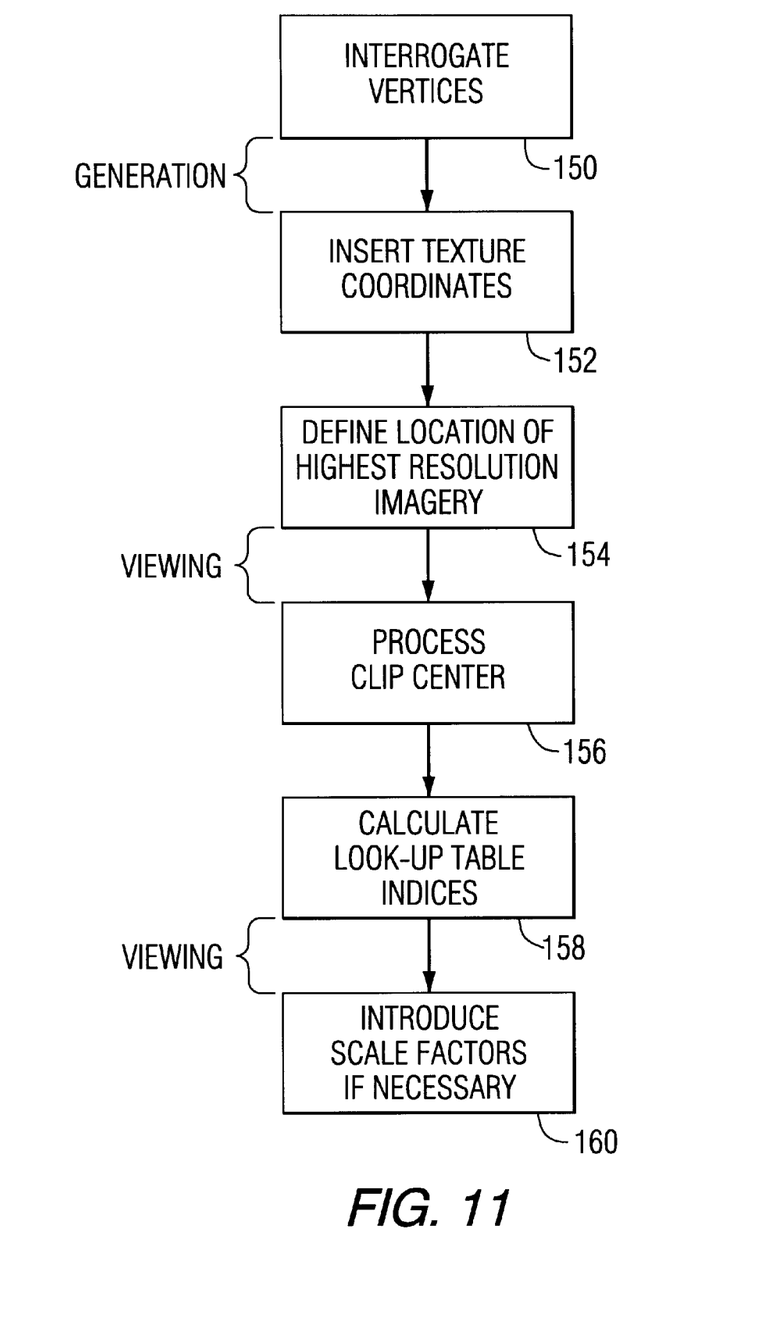

Referring now to FIG. 11, a flow chart illustrates the basic operation used by the system of the present invention to process and display building clip textures correctly. A clip map clip grid look-up table is used to overcome these limitations and pinpoint the exact location of where the clip center optimally should be located with respect to a particular x,y location. To build the table, the vertices of all the building polygon faces are interrogated for their corresponding texture coordinates (block 150). Each texture coordinate is inserted into a look-up table based on its corresponding polygon face vertex coordinates (block 152).

A clip center or point in the clip map is used to define the location of the highest resolution imagery within the clip map (block 154). Determining this center for a terrain surface clip map is actually achievable with little system complexity because a single clip texture maps contiguously onto the terrain elevation surface, so the camera coordinates are appropriate. The site model clip map has a clip center of its own and is processed according to its relative size and position on the terrain surface (block 156). The site model clip map, however, does introduce some locality limitations resulting from tall buildings or closely organized buildings. This necessitates the use of an additional look-up table to compensate for the site model clip map's lack of complete spatial coherence. The purpose of the clip grid is to map 3D spatial coordinates to clip center locations in the spatially incoherent clip map.

Figure 8:
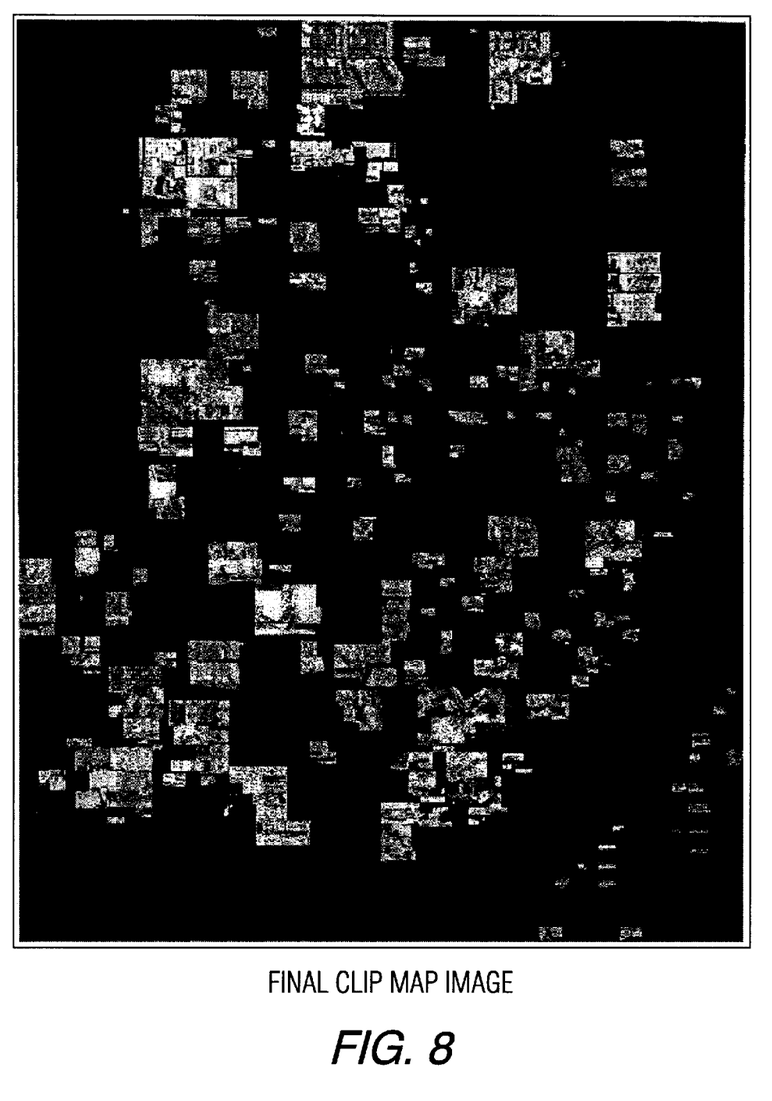
FIG. 8 is an example of a final site model clip map image.

The clip grid look-up table indices are calculated using a x,y scene location (the camera position) (block 158). If the terrain clip map and site model clip map are different sizes, a scale factor is introduced to normalize x,y scene location for the site model clip map (block 160). It has been found that with sufficient design and advances in the development of the spatial correctness of the building clip map, the need for the clip grid look-up table can be eliminated in up to 95% of the cases. A final clip map image is shown in FIG. 8.

It is also possible to extend the algorithm and use multiple site model clip maps. Using many smaller clip maps rather than one large clip map may prove to be a useful approach if clip maps of various resolutions are desired or if the paging in and out of clip maps from process space is achievable. However, it requires the maintenance of multiple clip centers and the overhead of multiple clip map pyramids.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A method for creating textured three-dimensional models in a computer system comprising the steps of:

creating a packed rectangle of textures for each of a plurality of three-dimensional objects corresponding to buildings modeled at a geographic site;

spatially arranging the packed rectangle of textures in a correct position with a site model clip map image;

interrogating the vertices of all building polygon faces for their corresponding texture coordinates and inserting the coordinates into a clip map clip grid look-up table based on the polygon vertex coordinates;

determining a location of a clip center with respect to a particular x,y location for the site model clip map image by looking up values within the clip map clip grid look-up table; and looking up a values within a second look-up table to compensate for locally limitations introduced into the site model clip map image and for spatial incoherence within the site model clip map image.

2. A method according to claim 1, and further comprising the steps of:
- collecting images of each of the plurality of three-dimensional objects from different viewpoints; and
- packing the images into a single rectangle, forming a composite building texture map for an object.

3. A method according to claim 2, and further comprising the step of rotating individual images to reduce the area of pixels included within the composite building texture map.

4. A method according to claim 2, and further comprising the step of calculating an image size having the smallest area with the smallest perimeter containing all the individual textures for each of the three-dimensional objects.

5. A method according to claim 2, and further comprising the step of checking each composite building texture map for overlap against other composite building texture map within the site model clip map image and expanding same until no overlap exists.

6. A method according to claim 1, and further comprising the step of building the clip map clip grid look-up table by interrogating the vertices of all building polygon faces for corresponding texture coordinates and inserting each texture coordinate into the look-up table based on the corresponding polygon face vertex coordinate.

7. A method according to claim 6, and further comprising the step of building the clip map clip grid look-up table indices using an x,y camera location.

8. A method according to claim 6, and further comprising the step of introducing a scale factor to normalize x,y scene location for the site model clip map image when a clip map corresponding to a geographic terrain and the site model clip map image are different sizes.

9. A method for creating textured three-dimensional models in a computer system comprising the steps of:
- forming a single rectangular, composite building texture map for each of a plurality of three-dimensional objects corresponding to buildings modeled at a geographic site;
- rotating individual images of the three-dimensional objects to reduce the area of pixels included within the composite building texture map;
- processing image sizes by area and image length and sorting same by area and image length;
- placing each composite building texture map in a spatially correct position within a site model clip map image;
- expanding the site model clip map image until no overlap remains;
- interrogating the vertices of all building polygon faces for their corresponding texture coordinate and inserting the coordinates into a clip map clip grid look-up table based on the polygon face vertex coordinates;
- determining a location of a clip center with respect to a particular x,y location for the site model clip map image by looking up values within the clip map clip grid look-up table; and
- looking up values within a second look-up table to compensate for locality limitations introduced into the site model clip map image and for spatial incoherence within the site model clip map image.

10. A method according to claim 9, and further comprising the step of expanding the site model clip map image from one direction to another.

11. A method according to claim 9, and further comprising the step of building the clip map clip grid look-up table by interrogating the vertices of all building polygon faces for corresponding texture coordinates and inserting each texture coordinate into the look-up table based on the corresponding polygon face vertex coordinate.

12. A system for creating three-dimensional models in a computer system and applicable for creating three-dimensional urban models and comprising:
- a computer, including a graphics application program and an application programming interface;
- a single rectangular, composite building texture map for each of a plurality of three-dimensional objects corresponding to individual buildings and having a reduced area of pixels within each composite building texture map as caused by rotating individual images;
- a site model clip map image containing each composite building texture map in a spatially correct position and that has been expanded such that no overlap remains;
- a clip map clip grid look-up table used for determining a location of a clip center with respect to a particular x,y location for the site model clip map image, said clip map clip grid look-up table formed as data representing vertices of all building polygon faces as interrogated for their corresponding texture coordinates based on polygon face vertex coordinates; and
- a second look-up table having values that are looked-up to compensate for locality limitations introduced into the site model clip map image and for spatial incoherence within the site model clip map image.

* * * * *

UNITED STATES PATENT AND TRADEMARK OFFICE
CERTIFICATE OF CORRECTION

PATENT NO. : 6,744,442 B1
DATED : June 1, 2004
INVENTOR(S) : Chan et al.

It is certified that error appears in the above-identified patent and that said Letters Patent is hereby corrected as shown below:

Column 8,
Line 65, delete "locally" substitute -- locality --

Column 9
Line 28, delete "claim 6" substitute -- claim 1 --

Signed and Sealed this

Seventh Day of September, 2004

JON W. DUDAS
*Director of the United States Patent and Trademark Office*